US008296389B2

(12) United States Patent
Maegawa et al.

(10) Patent No.: US 8,296,389 B2
(45) Date of Patent: Oct. 23, 2012

(54) CONTENT REPRODUCTION APPARATUS, CONTENT DELIVERY APPARATUS, CONTENT DELIVERY SYSTEM, AND METHOD FOR GENERATING METADATA

(75) Inventors: Hirotoshi Maegawa, Tokyo (JP); Norio Nagatsuka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 382 days.

(21) Appl. No.: 12/532,529

(22) PCT Filed: Apr. 5, 2007

(86) PCT No.: PCT/JP2007/057662
§ 371 (c)(1),
(2), (4) Date: Jan. 8, 2010

(87) PCT Pub. No.: WO2008/129600
PCT Pub. Date: Oct. 30, 2008

(65) Prior Publication Data
US 2010/0115025 A1 May 6, 2010

(51) Int. Cl.
*G06F 15/16* (2006.01)
(52) U.S. Cl. ........................................ 709/217; 709/203
(58) Field of Classification Search .................. 709/217, 709/203
See application file for complete search history.

(56) References Cited

U.S. PATENT DOCUMENTS

| 7,234,104 | B2* | 6/2007 | Chang et al. ............... 715/202 |
| 7,421,089 | B2* | 9/2008 | Camara et al. .............. 382/100 |
| 7,536,027 | B2* | 5/2009 | Nagao ......................... 382/100 |
| 7,826,709 | B2* | 11/2010 | Moriya et al. ............... 715/202 |
| 7,937,407 | B2* | 5/2011 | Goto et al. ................... 707/783 |
| 7,941,553 | B2* | 5/2011 | Baumeister et al. ......... 709/231 |
| 7,949,604 | B2* | 5/2011 | Asazu et al. ................. 705/51 |
| 7,966,339 | B2* | 6/2011 | Kim ............................. 707/758 |
| 7,996,431 | B2* | 8/2011 | Coffman et al. ............. 707/796 |
| 2002/0069218 | A1* | 6/2002 | Sull et al. .................... 707/501.1 |
| 2003/0012549 | A1* | 1/2003 | Ohnuma ....................... 386/46 |
| 2003/0126147 | A1* | 7/2003 | Essafi et al. ................. 707/100 |
| 2005/0060741 | A1* | 3/2005 | Tsutsui et al. ............... 725/32 |
| 2010/0054702 | A1* | 3/2010 | Kobayashi et al. .......... 386/95 |

FOREIGN PATENT DOCUMENTS

| JP | 2004193871 A | 7/2004 |
| JP | 2005229509 A | 8/2005 |
| JP | 200633182 A | 2/2006 |
| JP | 2006129132 A | 5/2006 |
| JP | 2006309751 A | 11/2006 |

OTHER PUBLICATIONS

Notice of Rejection dated Sep. 28, 2010, from the corresponding Japanese Application.

(Continued)

*Primary Examiner* — Kevin Bates
(74) *Attorney, Agent, or Firm* — Katten Muchin Rosenman LLP

(57) ABSTRACT

Metadata for a content delivered from a content server is generated while suppressing an increase in the network traffic. A content delivery system includes a content server and a client communicatively connected to the content server. The content server includes a content transmission unit for sending a content to the client. The client includes a content reception unit for receiving the content from the content server, a content reproduction unit for reproducing the received content, a metadata generation unit for applying predetermined analysis processing to the received content to generate metadata that indicates a result of the analysis processing, and a metadata transmission unit for sending the generated metadata.

12 Claims, 4 Drawing Sheets

OTHER PUBLICATIONS

International Preliminary Report on Patentability and Written Opinion of the International Searching Authority mailed Oct. 22, 2009, from the corresponding International Application.

International Search Report dated Jul. 10, 2007 from the corresponding PCT/JP2007/057662.

* cited by examiner

FIG.2

| No. | METADATA GENERATION REQUEST FLAG | PROGRAM | ARGUMENT |
|---|---|---|---|
| 1 | 1 | BEAT_DETECTION.exe | 0-511 |
| 2 | 1 | BEAT_DETECTION.exe | 512-1023 |
| 3 | 0 | CHORD_ANALYSIS.exe | |
| 4 | 0 | INSTRUMENT_ANALYSIS.exe | |
| 5 | 1 | MAIN_PART_EXTRACTION.exe | |

CONTENT REPRODUCTION APPARATUS, CONTENT DELIVERY APPARATUS, CONTENT DELIVERY SYSTEM, AND METHOD FOR GENERATING METADATA

TECHNICAL FIELD

The present invention relates to a content reproduction apparatus, a content delivery apparatus, a content delivery system, and a method for generating metadata.

BACKGROUND ART

Nowadays, various types of contents are delivered through various communication networks such as the Internet, and a user can select a desired content from an enormous number of contents provided on the communication networks and enjoy the content. In order for the user to efficiently find out a desired content from an enormous number of contents, it is important that various types of metadata for each content be prepared in advance. For example, for a content having a photograph image, not only bibliographic items such as a photographer and a shooting date but also analysis data indicating whether the photograph image includes a person's face and what hue the photograph image has are prepared in advance as metadata, so that it is possible to efficiently guide the user to select a content based on the metadata. In other words, it is possible to provide a user who is looking for a photograph image including a person's face or a user who is looking for a photograph image of blue sea, with such photograph images base on the metadata. The metadata can be generated through computer processing by applying predetermined analysis processing such as face detection or hue analysis to a content.

DISCLOSURE OF THE INVENTION

Problems to be Solved by the Invention

However, a content delivery device which manages an enormous number of contents, delivers a content requested by each of many users, and manages the content delivery records does not have enough calculation resources to perform computer processing to generate such metadata. If another computer is used to perform this computer processing, the enormous number of contents need to be sent to the another computer, which increases the network traffic.

In view of the above-mentioned circumstances, the present invention has been made, and therefore, it is an object of the present invention to provide a content reproduction apparatus, a content delivery apparatus, a content delivery system and a method for generating metadata capable of generating metadata for a content delivered from a content delivery apparatus while suppressing an increase in the network traffic.

Means for Solving the Problems

In order to solve the above-mentioned problems, the present invention provides a content reproduction apparatus communicatively connected to a content delivery apparatus, including: content reception means for receiving a content from the content delivery apparatus; content reproduction means for reproducing the received content; metadata generation means for applying predetermined analysis processing to the received content to generate metadata that indicates a result of the analysis processing; and metadata transmission means for sending the generated metadata.

The present invention also provides a content delivery apparatus communicatively connected to a content reproduction apparatus, including content transmission means for sending a content to the content reproduction apparatus, in which the content transmission means also sends, when sending the content to the content reproduction apparatus, a generation request for metadata for the content to the content reproduction apparatus, and restricts, when the metadata for the content is sent from the content reproduction apparatus, transmission of the generation request.

The present invention also provides a content delivery system, including: a content delivery apparatus; and a content reproduction apparatus communicatively connected to the content delivery apparatus, in which: the content delivery apparatus includes content transmission means for sending a content to the content reproduction apparatus; and the content reproduction apparatus includes: content reception means for receiving the content from the content delivery apparatus; content reproduction means for reproducing the received content; metadata generation means for applying predetermined analysis processing to the received content to generate metadata that indicates a result of the analysis processing; and metadata transmission means for sending the generated metadata.

The present invention also provides a method for generating metadata, including: a content transmission step of sending, in a content delivery apparatus, a content to a content reproduction apparatus communicatively connected to the content delivery apparatus; a content reception step of receiving, in the content reproduction apparatus, the content from the content delivery apparatus; a content reproduction step of reproducing, in the content reproduction apparatus, the received content; a metadata generation step of applying, in the content reproduction apparatus, predetermined analysis processing to the received content to generate metadata indicating a result of the analysis processing; and a metadata transmission step of sending, in the content reproduction apparatus, the generated metadata.

BRIEF DESCRIPTION OF THE DRAWINGS

FIG. 2 is a diagram schematically showing metadata generation request data included in a header part of a content.

BEST MODE FOR CARRYING OUT THE INVENTION

Hereinafter, an embodiment of the present invention will be described in detail with reference to the accompanying drawings.

Figure 1:
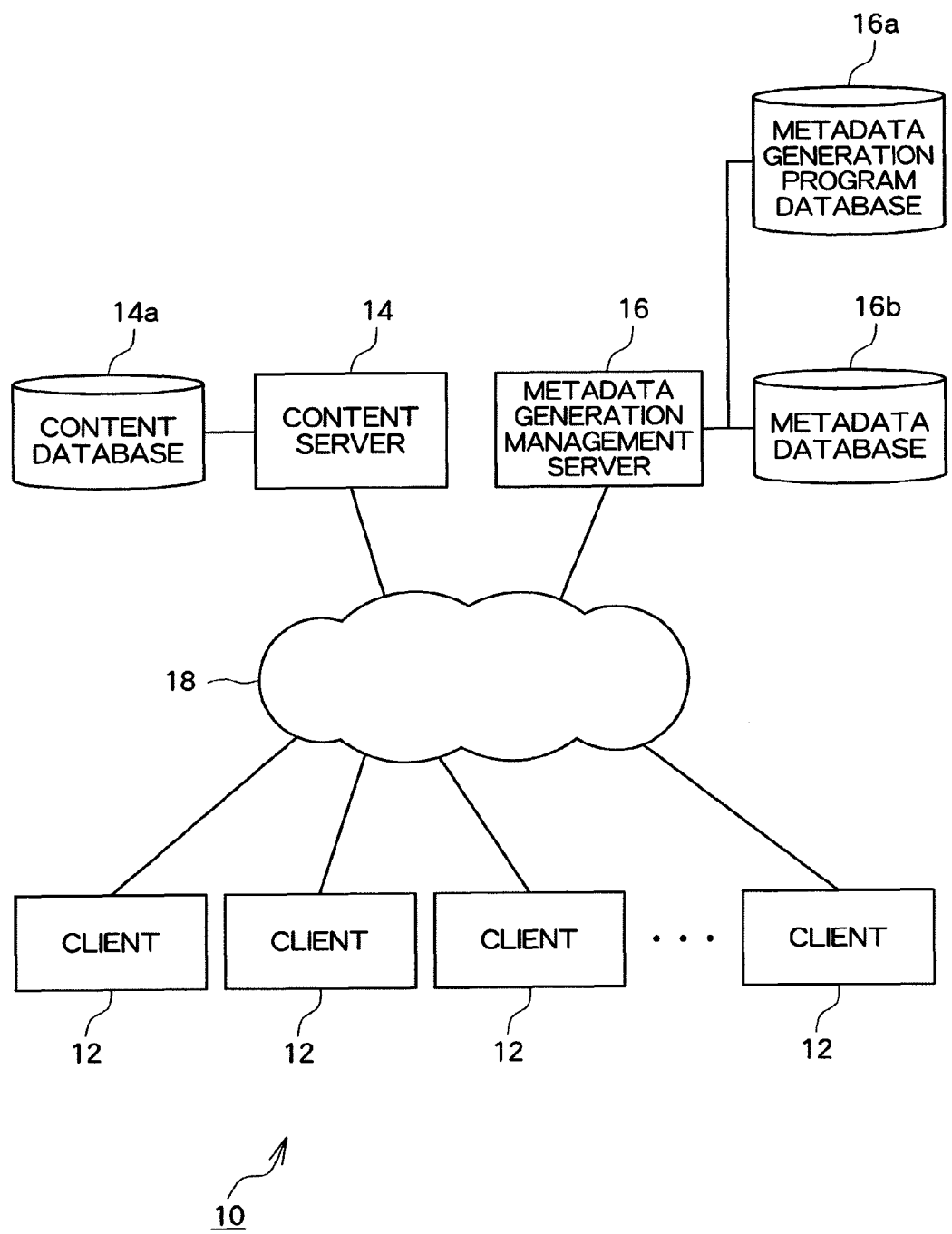
FIG. 1 is an entire configuration diagram of a content delivery system according to an embodiment of the present invention.

FIG. 1 is an entire configuration diagram of a content delivery system according to the embodiment of the present invention. As shown in FIG. 1, a content delivery system 10 according to this embodiment includes a plurality of clients (content reproduction apparatuses) 12, a content server (content delivery apparatus) 14, and a metadata generation management server (management apparatus) 16. The apparatuses are computer systems connected to a data communication network 18 such as the Internet and are capable of exchanging data with one another. The content server 14 and the metadata generation management server 16 are server computers disposed at an office, for example, and the clients 12 are home game equipment, personal computers, and the like disposed at home, for example.

The content server 14 is connected to a content database 14a which stores a lot of contents that include still image data of photographs, music data, and moving image data of movies or the like. When a user sends a content request which specifies a content, from his or her client 12 to the content server 14, the content server 14 sends the content (data) corresponding to the request, to the client 12. Further, the content server 14 holds metadata for a part of or all of the contents stored in the content database 14a, the metadata being obtained through various kinds of analysis processing. According to the metadata, the content server 14 provides and searches for contents that meet user's preferences.

Regardless of whether a content is still image data, music data, or moving image data, the metadata for the content includes bibliographic information such as a copyright holder. Further, when the content is still image data, a space frequency and a hue are analyzed in advance and the analysis results are included in the metadata. It is also analyzed whether the still image includes a face, a particular object, or a character, and the analysis result is also included in the metadata. When the content is music data, acoustical analyses such as beat detection, a tempo analysis, and a chord progression analysis are made in advance, and the analysis results are included in the metadata. When the content is moving image data, analyses for detecting the timing when the scene changes, a climax, and a part where a person or a particular object is seen are made in advance, and the analysis results are included in the metadata. Although those analyses can be easily realized by using known analysis programs, a large amount of processing is required in general.

In the content delivery system 10 of the embodiment of the present invention, the analysis processing of a content for generating the metadata is performed in the client 12 of the user who views or listens to the content. Specifically, a program to reproduce a content is installed in the client 12. When the user wants to reproduce a content stored in the content database 14a, the user downloads the content from the content server 14 and executes the program to reproduce the content. At this time, the downloaded content (data) is used for the reproduction and is also used for the analysis processing, and the analysis result is sent to the metadata generation management server 16 as metadata. More specifically, a program to apply predetermined analysis processing to the content received from the content server 14 and to generate metadata indicating the analysis result is installed in the client 12.

In general, the data amount of each content stored in the content database 14a is large. On the other hand, the data amount of an analysis result of the content is generally small. According to this embodiment, the client 12 applies the analysis processing to a content (having a large data amount) downloaded to be reproduced in the client 12, generates metadata (having a small data amount), and sends the metadata through the data communication network 18. Therefore, traffic is prevented from being drastically increased even when the content server 14 distributes the analysis processing to other computers.

As shown in FIG. 1, the metadata generation management server 16 is connected to a metadata generation program database 16a and to a metadata database 16b. The metadata generation program database 16a stores multiple metadata generation programs. When each of the metadata generation programs is downloaded to the client 12 and executed in the client 12, particular analysis processing is applied to a specified content and metadata that includes the analysis result is generated.

The metadata database 16b stores metadata sent from the client 12. The metadata stored in the metadata database 16b is transferred from the metadata generation management server 16 to the content server 14 at appropriate timing, for example, when traffic in the data communication network 18 is low.

FIG. 2 schematically shows metadata generation request data included in the header part of a content sent from the content server 14 to the client 12. As shown in FIG. 2, the header part of the content contains the metadata generation request data, for each of predetermined kinds of metadata required for the content. In the metadata generation request data, an identification number (No.), a metadata generation request flag indicating whether the metadata needs to be generated, the name of a program used to generate the metadata, and an argument used to execute the program are associated. The argument of the program is information for specifying a part of the content, to which processing is to be applied by the program, for example. When a content having the above-mentioned format is downloaded from the content server 14, the client 12 refers to the metadata generation request data contained in the header part, and checks whether metadata needs to be generated for the downloaded content. When metadata needs to be generated, the client 12 generates the metadata.

Figure 3:
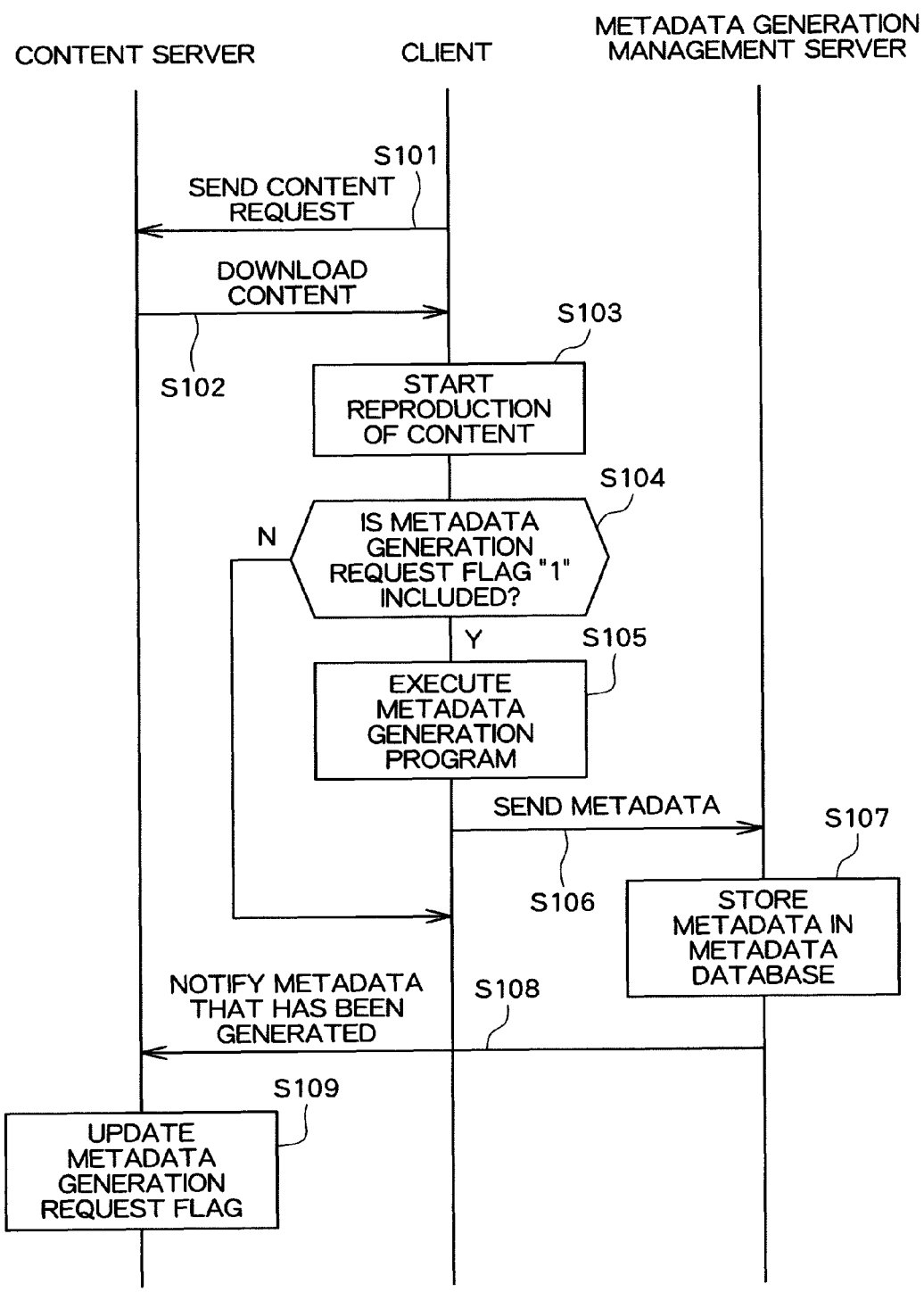
FIG. 3 is an operation sequence diagram of the content delivery system according to the embodiment of the present invention.

FIG. 3 shows an operation sequence of the content delivery system 10. As shown in FIG. 3, in the content delivery system 10, when the client 12 sends a content request which specifies a content to the content server 14 (S101), the content server 14 reads the content from the content database 14a and sends the content to the client 12 (S102). After receiving the content, the client 12 starts reproducing the content (S103). Specifically, when the content is still image data, the client 12 starts displaying a still image. When the content is music data, the client 12 starts outputting music. When the content is moving image data, the client 12 starts displaying a moving image. Then, the client 12 reads the header part of the content received in S102 to check whether a metadata generation request flag indicating that metadata needs to be generated ("1") is included (S104). When a metadata generation request flag indicating that metadata needs to be generated ("1") is included, the client 12 executes a program corresponding to the flag to apply analysis processing to the content received in S102 and generate metadata (S105). At this time, when the client 12 does not have the program corresponding to the flag, the client 12 requests the metadata generation management server 16 to send the program. According to the request, the metadata generation management server 16 reads a corresponding metadata generation program from the metadata generation program database 16a and sends the metadata generation program to the client 12.

When the metadata for the content that is being reproduced is generated by the metadata generation program, the client 12 sends the metadata to the metadata generation management server 16 (S106). The metadata generation management server 16 stores the metadata in the metadata database 16b (S107) and notifies that the metadata has been generated to the content server 14 (S108). This notification includes the identification information of the content and the identification number of the newly generated metadata. When the notification is received, the content server 14 updates the header part of the content according to the notification (S109). Specifically, among metadata generation request flags recorded in the header part of the content that is identified by the identification information included in the notification, the content server 14 changes the metadata generation request flag corresponding to the identification number included in the notification such that the metadata generation request flag indicates that metadata does not need to be generated ("0"). Thereafter, the content that includes the changed metadata generation request flag in its header part is sent to any client 12, so the metadata can be prevented from being generated again in the client 12.

As described above, according to this embodiment, when a content is sent from the content server 14 to the client 12 for the purpose of reproduction, the data of the content is used to generate metadata. Therefore, the metadata for the content delivered from the content server 14 can be generated while suppressing an increase in the network traffic.

Note that the present invention is not limited to the above-mentioned embodiment, and various modifications can be made. For example, although the metadata generation request data is included in the header part of the content delivered from the content server 14 in the above-mentioned embodiment, a metadata generation request may be sent to the client 12 separately from the content. Alternatively, the content server 14 or the metadata generation management server 16 may deliver, to the client 12, data indicating whether or not metadata needs to be generated, for example, a list of contents for which metadata needs to be generated or a list of contents for which metadata does not need to be generated, and the client 12 may check whether metadata needs to be generated, according to this data, and generate metadata only for a content whose metadata needs to be generated.

Figure 4:
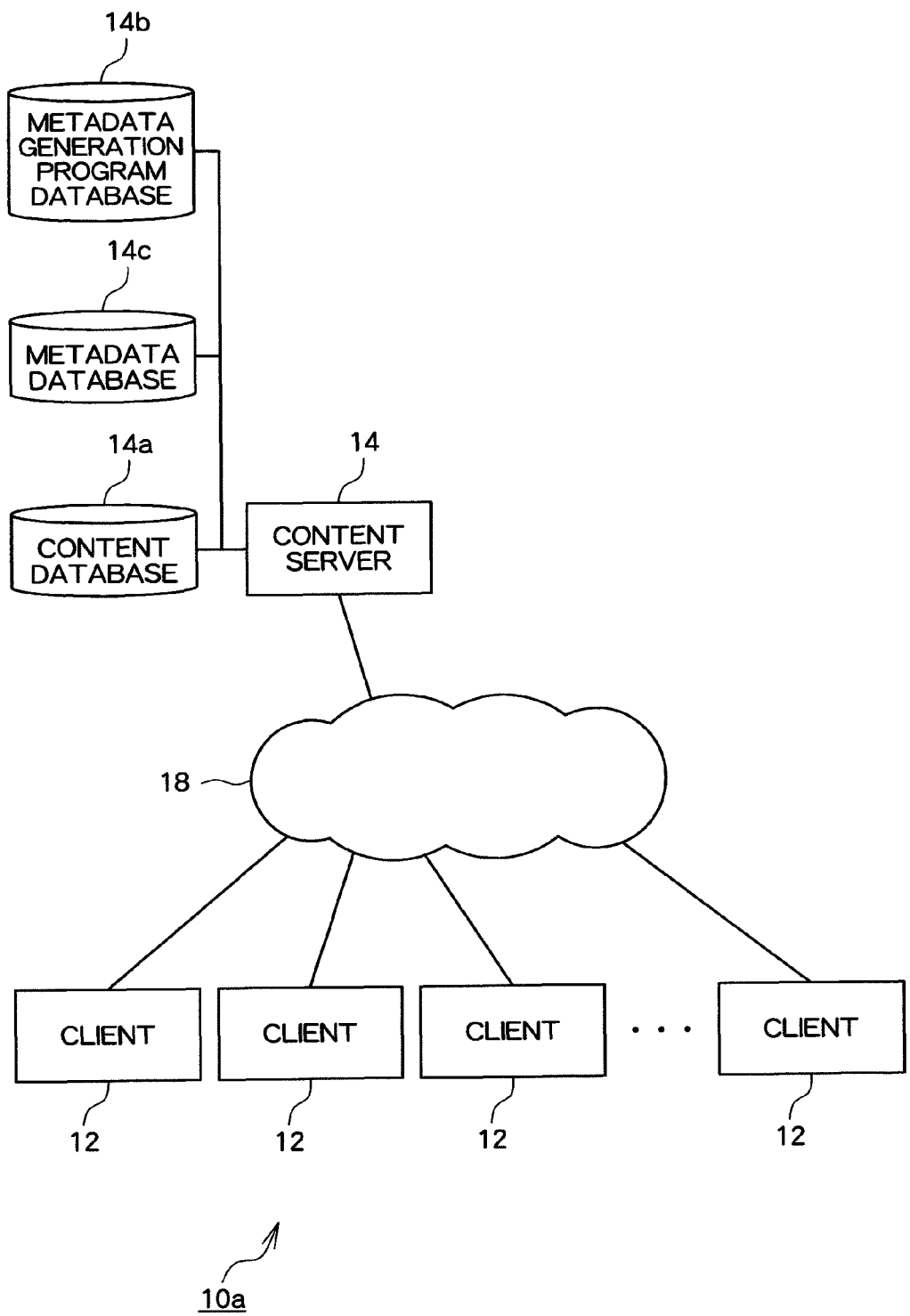
FIG. 4 is an entire configuration diagram of a content delivery system according to a modified embodiment.

Although, in the above-mentioned embodiment, the metadata is sent to the metadata generation management server 16 and is then sent from the metadata generation management server 16 to the content server 14, the metadata may be directly sent from the client 12 to the content server 14. FIG. 4 is an entire configuration diagram of a content delivery system according to a modified embodiment. As shown in FIG. 4, a content delivery system 10a is different from the content delivery system 10 shown in FIG. 1 in that the metadata generation management server 16 is omitted and a metadata generation program database 14b and a metadata database 14c are connected to the content server 14. In the content delivery system 10a, when the client 12 generates metadata in the same way as in the content delivery system 10, the client 12 directly sends the generated metadata to the content server 14. When the metadata is received, the content server 14 stores the metadata in the metadata database 14c and updates the header part of the content corresponding to this metadata, stored in the content database 14a. Further, the content server 14 delivers a metadata generation program in response to a request from the client 12. According to this modified embodiment, the metadata generation management server 16 can be omitted.

The invention claimed is:

1. A content delivery apparatus having a processor communicatively connected to a content reproduction apparatus having a processor, comprising:
    a content transmission unit that sends a content to the content reproduction apparatus, wherein the content transmission unit checks a metadata database to determine if metadata exists for the content, and
    if metatadata does not exist for the content in the metadata database, the content transmission unit also sends, when sending the content to the content reproduction apparatus, a generation request for metadata for the content to the content reproduction apparatus; and
    a metadata reception unit that receives, when the metadata is generated by the content reproduction apparatus in response to the generation request, the metadata from the content reproduction apparatus, and updates the metadata database with the received metadata.

2. A content delivery apparatus according to claim 1, wherein the content transmission unit sends, when sending the content to the content reproduction apparatus, the generation request as a header of the content.

3. A content delivery system, comprising:
    a content delivery apparatus having a processor; and
    a content reproduction apparatus having a processor communicatively connected to the content delivery apparatus, wherein:
    the content delivery apparatus comprises:
    a content transmission unit that sends a content to the content reproduction apparatus, wherein the content transmission unit checks a metadata database to determine if metadata exists for the content, and
    if metadata does not exists for the content in the metatadata database, the content transmission unit also sends, when sending the content to the content reproduction apparatus, a generation request for metadata for the content to the content reproduction apparatus; and
    the content reproduction apparatus comprises:
    a content reception unit that receives the content from the content delivery apparatus, wherein the content reception unit also receives, when receiving the content, the generation request from the content delivery apparatus;
    a content reproduction unit that reproduces the content received by the content reception unit;
    a metadata generation unit that applies, according to the generation request received by the content reception unit, predetermined analysis processing to the content received by the content reception unit to generate the metadata that indicates a result of the analysis processing; and
    a metadata transmission unit that sends the metadata generated by the metadata generation unit to the content delivery apparatus;
    wherein the content delivery apparatus further comprise a metadata reception unit that receives the metadata from the content reproduction apparatus in response to the generation request and updates the metadata database with the received metadata.

4. A content delivery system according to claim 3, wherein the content transmission unit sends, when sending the content to the content reproduction apparatus, the generation request as a header of the content.

5. A method for generating metadata, comprising:
    a content transmission step of sending, in a content delivery apparatus, a content to a content reproduction apparatus communicatively connected to the content delivery apparatus,
    wherein the content transmission step includes a step of checking a metadata database to determine if metadata exists for the content, and if metadata does not exist for the content, sending, when sending the content to the content reproduction apparatus, a generation request for metadata for the content to the content reproduction apparatus;
    a content reception step of receiving, in the content reproduction apparatus, the content from the content delivery apparatus, wherein the content reception step includes a step of receiving, when receiving the content, the generation request from the content delivery apparatus;

a content reproduction step of reproducing, in the content reproduction apparatus, the content received in the content reception step;

a metadata generation step of applying according to the generation request received in the content reception step, in the content reproduction apparatus, predetermined analysis processing to the content received in the content reception step to generate the metadata indicating a result of the analysis processing;

a metadata transmission step of sending, in the content reproduction apparatus, the metadata generated in the metadata generation step to the content delivery apparatus;

a metadata reception step of receiving, in the content delivery apparatus, the metadata sent in the metadata transmission step in response to the generation request; and a metadata database updating step of updating the metadata database with the received metadata.

6. A method for controlling a content delivery apparatus communicatively connected to a content reproduction apparatus, comprising:

a content transmission step of sending, in the content delivery apparatus, a content to the content reproduction apparatus, wherein the content transmission step includes a step of checking a metadata database to determine if metadata exists for the content, and if metadata does not exist for the content in the content database, sending, when sending the content to the content reproduction apparatus, a generation request for metadata for the content to the content reproduction apparatus;

a metadata reception step of receiving, when the metadata is generated by the content reproduction apparatus in response to the generation request, the metadata from the content reproduction apparatus;

a metadata database updating step of updating the metadata database with the received metadata.

7. A content delivery apparatus having a processor communicatively connected to both a content reproduction apparatus having a processor and a management apparatus having a processor communicatively connected to the content reproduction apparatus, comprising:

a content transmission unit that sends a content to the content reproduction apparatus, wherein the content transmission unit checks a metadata database to determine if metadata exists for the content, and if metadata does not exist for the content in the content database, also sends, when sending the content to the content reproduction apparatus, a generation request for metadata for the content to the content reproduction apparatus; and a notification reception unit that receives, when the metadata is generated by the content reproduction apparatus in response to the generation request, a notification data that gives notice of generation of the metadata sent from the management apparatus which receives the metadata generated by the content reproduction apparatus and updates the metadata database with the received metadata.

8. A content delivery apparatus according to claim 7, wherein the content transmission unit sends, when sending the content to the content reproduction apparatus, the generation request as a header of the content.

9. A content delivery system, comprising:

a content delivery apparatus having a processor;

a content reproduction apparatus having a processor communicatively connected to the content delivery apparatus; and a management apparatus having a processor communicatively connected to both the content delivery apparatus and the content reproduction apparatus, wherein:

the content delivery apparatus comprises:

content transmission unit that sends a content to the content reproduction apparatus, wherein the content transmission unit checks a metadata database to determine if metadata exists for the content, and if metadata does not exist for the content, also sends, when sending the content to the content reproduction apparatus, a generation request for metadata for the content to the content reproduction apparatus; and the content reproduction apparatus comprises:

a content reception unit that receives the content from the content delivery apparatus, wherein the content reception unit also receives, when receiving the content, the generation request from the content delivery apparatus;

a content reproduction unit that reproduces the content received by the content reception unit;

a metadata generation unit that applies, according to the generation request received by the content reception unit, predetermined analysis processing to the content received by the content reception unit to generate the metadata that indicates a result of the analysis processing; and a metadata transmission unit that sends the metadata generated by the metadata generation unit to the management apparatus; and the management apparatus comprises:

a metadata reception unit that receives the metadata sent from the content reproduction apparatus in response to the generation request; and a notification transmission unit that sends, when the metadata is received by the metadata reception unit, a notification data that gives notice of generation of the metadata;

wherein the content delivery apparatus further comprises a notification reception unit that receives the notification data sent from the management apparatus;

wherein the content transmission unit updates the metadata database with the received metadata and restricts transmission of the generation request after reception of the notification data by the notification reception unit.

10. A content delivery system according to claim 9, wherein the content transmission unit sends, when sending the content to the content reproduction apparatus, the generation request as a header of the content.

11. A method for generating metadata, comprising:

a content transmission step of sending, in a content delivery apparatus, a content to a content reproduction apparatus communicatively connected to both the content delivery apparatus and a management apparatus communicatively connected the content delivery apparatus, wherein the content transmission step includes a step of checking a metadata database to determine if metadata exists for the content, and if metadata does not exist for the content in the metadata database, sending, when sending the content to the content reproduction apparatus, a generation request for metadata for the content to the content reproduction apparatus;

a content reception step of receiving, in the content reproduction apparatus, the content from the content delivery apparatus, wherein the content reception step includes a step of receiving, when receiving the content, the generation request from the content delivery apparatus;

a content reproduction step of reproducing, in the content reproduction apparatus, the content received in the content reception step;

a metadata generation step of applying according to the generation request received in the content reception step, in the content reproduction apparatus, predetermined analysis processing to the content received in the content reception step to generate the metadata indicating a result of the analysis processing;

a metadata transmission step of sending, in the content reproduction apparatus, the metadata generated in the metadata generation step to the content delivery apparatus;

a metadata reception step of receiving, in the management apparatus, the metadata sent from the content reproduction apparatus;

a notification transmission step of sending in the management apparatus, when the metadata is received in the metadata reception step, by the metadata reception step, the notification data that gives notice of generation of the metadata;

a notification reception step of receiving, in the content delivery apparatus, the notification data sent in the notification transmission step and updating the metadata database with the received metadata;

wherein the content delivery apparatus restricts, after the notification reception step, transmission of the generation request in the content transmission step.

12. A method for controlling a content delivery apparatus communicatively connected to both a content reproduction apparatus and a management apparatus communicatively connected to the content reproduction apparatus, comprising:

a content transmission step of sending, in the content delivery apparatus, a content to the content reproduction apparatus, wherein the content transmission step includes a step of checking a metadata database to determine if metadata exists for the content in the metadata database, and if metadata does not exists for the content in the metadata database, sending, when sending the content to the content reproduction apparatus, a generation request for metadata for the content to the content reproduction apparatus; and a notification reception step for receiving, when the metadata is generated by the content reproduction apparatus, a notification data that gives notice of generation of the metadata sent from the management apparatus which receives the metadata generated by the content reproduction apparatus and for updating the metadata database with the received metadata;

wherein the content delivery apparatus restricts, after the notification reception step, transmission of the generation request in the content transmission step.

* * * * *